UNITED STATES PATENT OFFICE.

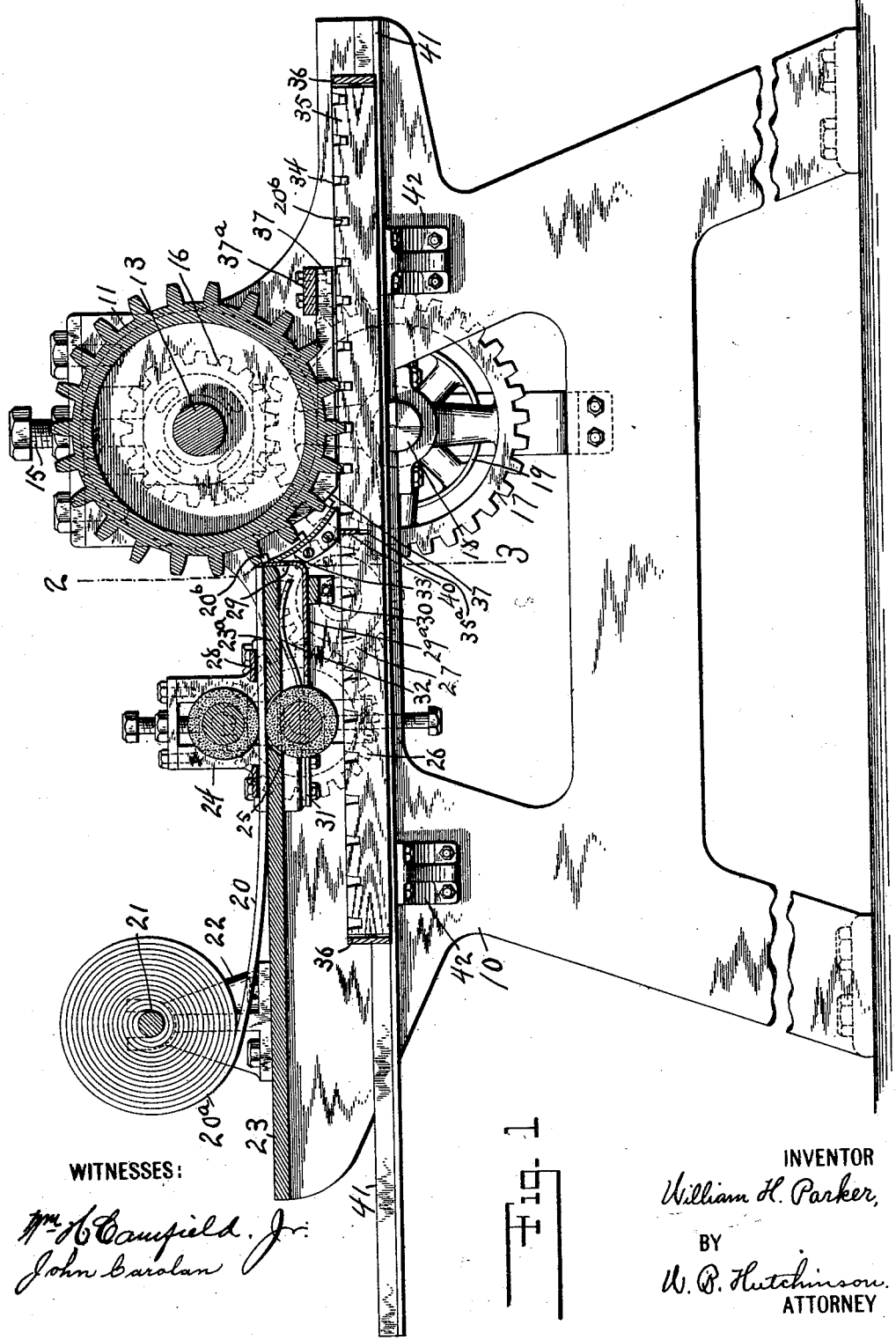

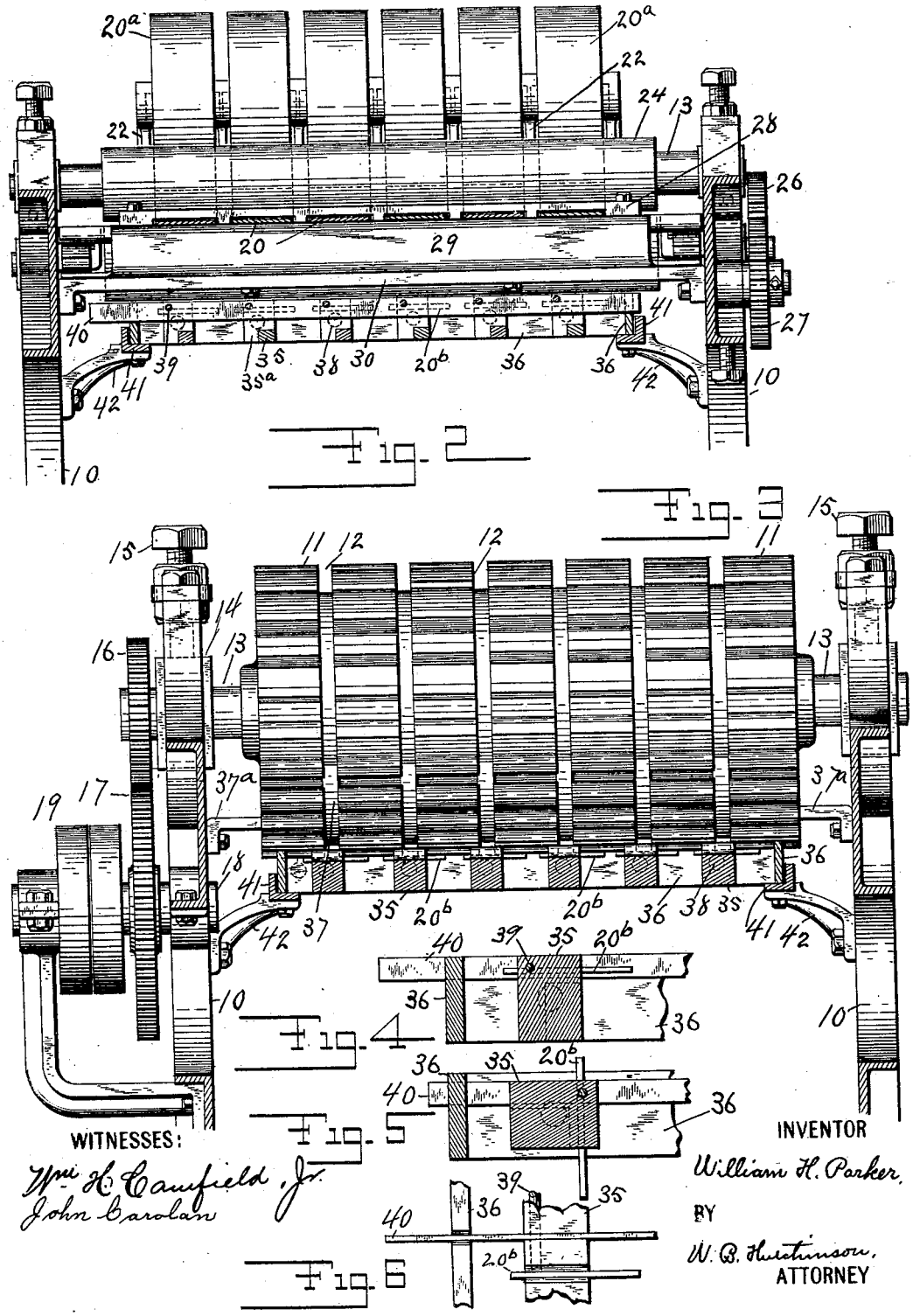

WILLIAM H. PARKER, OF MELLENVILLE, NEW YORK, ASSIGNOR, BY MESNE ASSIGNMENTS, TO PARKER MATCH COMPANY, A CORPORATION OF NEW JERSEY.

MATCH-MACHINE.

SPECIFICATION forming part of Letters Patent No. 712,712, dated November 4, 1902.

Application filed November 5, 1901. Renewed August 28, 1902. Serial No. 121,337. (No model.)

*To all whom it may concern:*

Be it known that I, WILLIAM H. PARKER, of Mellenville, Columbia county, New York, have invented certain new and useful Improvements in Match-Machines, of which the following is a full, clear, and exact description.

My invention relates to improvements in match-machines; and the object of my invention is to produce a very simple machine which can be run very rapidly, which is adapted to cut match-splints simultaneously from a series of veneer strips or from a roll, which has a very simple form of carrier to receive the severed splints, the carrier being adapted either for hand or machine dipping, which has a very positive means for guiding the severed splints to their receiving-recesses in the carrier, which has a toothed wheel to cause the severing of the splints and to deliver the splints to the carrier, which has the said toothed wheel to also feed the carrier through the machine, and, in general, to produce a machine which is positive, easily controlled, and adapted to cheapen the cost of matches.

To these ends my invention consists of a match-machine the construction, arrangement, and operation of which will be hereinafter fully described and the novel features claimed.

Reference is to be had to the accompanying drawings, forming a part of this specification, in which similar figures and letters of reference refer to similar parts throughout the several views.

Figure 1 is a vertical longitudinal section of the machine. Fig. 2 is a broken vertical cross-section on the line 2 3 of Fig. 1 looking toward the front of the machine. Fig. 3 is a section on the line 2 3, but looking toward the rear of the machine. Fig. 4 is a broken detail cross-section of the splint carrier or frame, showing the splints in horizontal position. Fig. 5 is a section similar to Fig. 4, but with the splints tilted into vertical position ready for dipping; and Fig. 6 is a broken plan view of a portion of the dipping frame or carrier.

The frame 10 may be of any approved design, and arranged transversely in the upper part thereof is a toothed wheel 11, which is cut, as shown at 12 in Fig. 3, into a series of sections, although these sections may be independent wheels so long as the teeth are all in alinement and they all turn in unison. The recesses 12 between the wheel-sections are to provide for the match-splint ejectors, which will be hereinafter referred to.

The toothed wheel 11 is carried by the transverse shaft 13, which is journaled in vertically-adjustable boxes 14, these being regulated by the screws 15 in a well-known manner. The toothed wheel may be turned in any convenient way; but, as shown, its shaft connects by gears 16 and 17 with the driving-shaft 18, which is provided with suitable driving-pulleys 19, though of course this may be driven in any convenient manner.

The stock 20 is in the form of veneer strips, which are taken from rolls 20$^a$, and as usual in such cases the width of the veneer strip or stock corresponds to the length of the match-splint to be cut. The rolls 20$^a$ of veneer can be supported in any convenient manner, such as on the transverse spindle 21, which is mounted removably in the standards 22 on the table 23 of the machine, this table being arranged horizontally, so that the stock may be fed conveniently over it. It will be observed that the spindle 21 can be easily lifted out of its supports, so that a new series of veneer rolls 20$^a$ can be placed on it when others have been exhausted, and I preferably provide a series of these standards 22, so that they will act as guides to hold the veneer rolls or stock the correct distance apart, as shown clearly in Fig. 2. The veneer strips or stock 20 are fed forward by feed-rolls 24 and 25, which, as usual in machines of this character, have their meeting-points adjacent to the upper surface of the table 23, and these rolls are preferably rubber-covered. They also have the usual means of vertical adjustment in relation to each other.

The feed-rolls can be turned in any usual way, and, as illustrated, they connect by gears 26 and 27 with the gear-wheel 17 of the driving-shaft 18, the gear-wheel 26 being attached to the shaft of the lower feed-roll 25.

As the stock is fed by the feed-rolls toward the toothed wheel 11 it passes through the transverse guide-bar 28, which is slotted on the under side so as to properly guide the stock, (see Fig. 2,) and the free edges of the stock are pushed over the cutting edge of the knife 29, the edge of which is horizontal and is flush with the inner end of the table. The inner portion of this knife is vertical, as shown clearly in Fig. 1, and the body of the knife is supported near its inner edge on a cross-bar 30, and the knife is also secured at 31 to the under side of the table, the sides of the knife extending forward beneath the table at the ends of the rolls 25 for this purpose. However, the means for supporting the knife can be departed from and any suitable support provided for it.

To facilitate the cutting off of the splints as the inner ends of the stock are struck by the toothed wheel, the inner end or section 23$^a$ of the table is preferably yielding, as shown in Fig. 1, and can be held normally level by springs, as 32.

It will be noticed that as the stock is advanced against the face of the toothed wheel 11 it will be forced downward by the teeth of the wheel, and so cut off transversely by the knife 29. A curved guide 33 extends downward and rearward from the knife-edge, this guide being curved to correspond with the curvature of the wheel 11, and it prevents the splints from flying out from between the teeth of the wheel, and as the splints are forced downward they are also gradually forced outward by the ejectors 37, (see Fig. 1,) the inner ends of which extend upward between the wheel-sections, as the drawing clearly shows, while the outer ends are secured to a cross-bar 37$^a$.

It will be noticed that the guide or guide-plate 33, in conjunction with the ejectors 37, forms a downwardly-converging guide, so that the splints pushed through this guide are positively forced into the transverse recesses or notches 34 of the bars 35, which are arranged longitudinally in the frame 36, the said frame and bars forming a carrier for the splints. It will be further noted that as the splints drop horizontally into the notches 34 they come directly beneath the faces of the teeth of the wheel 11, so that they are forced snugly into the said recesses or notches, which, it will be observed, are somewhat wedge-shaped or tapering, so that they hold the splints very firmly. It will also be noticed that the teeth of the wheel enter these notches sufficiently to form a very sure means of advancing the carrier, and thus the use of ratchet and other mechanism generally employed for this purpose is avoided.

The bars 35 tilt laterally, so that by giving them a quarter-turn the splints may be turned over to a vertical position, as illustrated in Fig. 5. They are pivoted at the ends, as shown at 38, and connect by pins 39 with a laterally-moving rod 40, which is adapted to extend outward beyond the sides of the frame 36, and to provide for the tilting of the bars 35 they are slotted laterally, as shown at 35$^a$ in Figs. 1 and 2, thus making room for the rod 40 when the bars tilt. Any suitable means may be used for actuating the rod 40. It will be observed that if it comes in contact with any suitable abutment it will be moved laterally, thus tilting the whole series of bars 35, and the means for moving the rod 40 is not shown, because such movements are well understood, and it will be seen that the abutment for actuating the rod might be at any point during the travel of the carrier or frame 36.

The frame 36 slides longitudinally through the machine on the tracks 41, which can be made of angle-iron, and the tracks are supported on suitable brackets 42.

I have shown a single frame 36; but it will be understood that this frame and the accessories can be extended to any reasonable length and that a series of such frames may be linked together, if desired, to form a continuous carrier adapted for the continuous process of dipping. This arrangement is so well understood in the art that no novelty is claimed for it, and it is not shown.

The operation of the machine will be understood from the description given, and it will be seen that when the machine is started and the stock fed into it the operation is continuous. There is no intermittent movement, because when the stock is fed forward between the teeth of the wheel 11 the time is so short before the teeth push it down across the knife that there is no need for making the movement of the stock intermittent, because in its nature it will yield slightly, if necessary. It will be seen that as the splints are cut off they are positively forced by the teeth of the wheel 11 down through the guide formed by the converging parts 33 and 37, that the splints are pushed by the teeth firmly into the notches 34 of the carrier, and that the carrier is positively and regularly advanced by the turning of the wheel 11. The arrangement described makes a very secure holder of the individual splints, and they are carried horizontally, so that there is little likelihood of their being disturbed, and they may be turned to a vertical position whenever it is necessary to dip them. Where the carrier or frame is used for hand-dipping, the bars 35 may be tilted by simply pushing on the connecting-rod 40. I have not shown means for removing the splints; but it will be seen that this can be done in many ways.

Having now fully described my invention, what I claim, and desire to secure by Letters Patent, is—

1. A match-machine, comprising a stationary knife, a toothed wheel journaled parallel with the knife and arranged so that its teeth turn near the knife-edge, means for feeding stock between the teeth of the wheel and over the knife-edge, a guide to receive the splints from the knife and carry them outward beyond the teeth of the wheel, and a carrier to receive the splints, said carrier being directly engaged and driven by the toothed wheel.

2. A match-machine, comprising a stationary knife, a toothed wheel turning opposite the knife, means for feeding stock over the knife-edge and between the teeth of the wheel, a guide to receive the splints and carry them outward from between the teeth of the wheel, and a movable carrier having notches to receive the splints, the notches being also arranged so as to engage with the teeth of the wheel by which arrangement the splints are pressed by the wheel-teeth into the said notches and the carrier is advanced.

3. In a match-machine, the cutting mechanism comprising a stationary knife, a toothed wheel turning opposite the knife, means for feeding stock over the knife-edge and between the teeth of the wheel, and a yielding table or support for the stock, said support being arranged behind the knife-edge.

4. A match-machine comprising a stationary knife, a toothed wheel journaled parallel with the knife and arranged to have its teeth turn adjacent to the knife-edge, means for feeding stock over the knife-edge and between the teeth of the wheel, a guide to receive the splints from the knife and carry them outward from between the teeth of the wheel, and a movable carrier traveling tangentially to and driven by the toothed wheel, said carrier comprising parallel bars having transverse notches to receive the splints.

5. A match-machine, comprising a rotating toothed wheel, a carrier having transverse notches to receive the wheel-teeth, mechanism for cutting and delivering splints between the wheel-teeth, and a guiding device to guide the splints into the notches of the carrier and opposite the teeth of the wheel so that the pressure of the teeth jams the splints into the said notches.

6. In a match-machine, a carrier comprising parallel transversely-notched bars pivoted so as to turn on their longitudinal axes, and a laterally-arranged rod pivoted to the bars so that by moving the rod longitudinally the bars may be tilted.

7. A match-machine, comprising a stationary knife, a yielding table behind the knife-edge, a toothed wheel turning opposite the knife-edge and provided with a series of circumferential recesses, means for feeding a plurality of strips of stock over the knife-edge and between the wheel-teeth, stationary ejectors held in the recesses of the wheel and curving outward to a point beyond the periphery of the teeth, a guide-plate opposite the wheel-teeth and opposite the said ejectors, and a carrier movable opposite the wheel, said carrier having transverse notches arranged to receive the splints and to also engage with the teeth of the wheel.

In witness whereof I have signed my name to this specification in the presence of two subscribing witnesses.

WILLIAM H. PARKER.

Witnesses:
CLAUDE B. SOUTHARD,
EMMA L. SOUTHARD.